United States Patent [19]
Kline et al.

[11] Patent Number: 5,942,745
[45] Date of Patent: Aug. 24, 1999

[54] METHOD AND APPARATUS FOR DIGITAL IMAGING WITH REDUCED PERIODIC ARTIFACTS

[75] Inventors: John F. Kline, Londonderry; Glenn E. Cabana, Derry, both of N.H.

[73] Assignee: Presstek, Inc., Hudson, N.H.

[21] Appl. No.: 09/021,353

[22] Filed: Feb. 10, 1998

Related U.S. Application Data

[60] Provisional application No. 60/069,915, Dec. 17, 1997.

[51] Int. Cl.⁶ .................................................. H01J 40/14
[52] U.S. Cl. ........................................ 250/208.1; 382/275
[58] Field of Search ........................... 250/208.1, 559.07; 347/234, 238; 358/293, 298, 283; 382/267, 275

[56] References Cited

U.S. PATENT DOCUMENTS

| | | | |
|---|---|---|---|
| 4,739,416 | 4/1988 | Manian | 358/302 |
| 4,751,522 | 6/1988 | Henzi et al. | 346/107 R |
| 4,801,950 | 1/1989 | Frehling | 346/108 |
| 4,814,886 | 3/1989 | Kuge et al. | 358/293 |
| 4,878,063 | 10/1989 | Katerberg | 346/1.1 |
| 5,068,904 | 11/1991 | Yamazaki | 382/46 |
| 5,274,394 | 12/1993 | Corona et al. | 346/1.1 |
| 5,291,248 | 3/1994 | Isobe | 355/228 |
| 5,453,777 | 9/1995 | Pensavecchia et al. | 347/234 |

FOREIGN PATENT DOCUMENTS

| | | |
|---|---|---|
| 0 186 508 | 7/1986 | European Pat. Off. . |
| 0 412 036 | 2/1991 | European Pat. Off. . |
| 0 507 328 | 10/1992 | European Pat. Off. . |
| 0 517 543 | 12/1992 | European Pat. Off. . |
| 58-215808 | 6/1985 | Japan . |
| 59-240555 | 6/1986 | Japan . |
| 880248239 | 4/1990 | Japan . |

*Primary Examiner*—Que T. Le
*Attorney, Agent, or Firm*—Cesari and McKenna, LLP

[57] ABSTRACT

In a digital imaging system including an array of imaging devices that apply an image to a recording medium such as a lithographic printing plate, elimination or reduction of longitudinal imaging artifacts is accomplished by blending the zones imaged by each the devices. In the course of a complete scan of the recording medium, the imaging devices each traverse a series of longitudinal columns of dot locations, and the devices are fired only at appropriate dot locations as determined by the digital image data. By operating adjacent imaging devices such that the zones they would ordinarily cover are blended, artifacts at the boundary between zones (such as seams) are hidden. While sufficient visual disruption to eliminate artifacts is ensured, noticeable visual artifacts are not created as a consequence of the disruption.

18 Claims, 2 Drawing Sheets

METHOD AND APPARATUS FOR DIGITAL IMAGING WITH REDUCED PERIODIC ARTIFACTS

RELATED APPLICATION

This application claims priority from U.S. Provisional Application Ser. No. 60/069,915, entitled METHOD AND APPARATUS FOR DIGITAL IMAGING WITH REDUCED PERIODIC ARTIFACTS, filed on Dec. 17, 1997.

BACKGROUND OF THE INVENTION

1. Field of the Invention

The present invention relates to digital printing apparatus and methods, and more particularly to a system for imaging lithographic printing members on- or off-press using digitally controlled laser output.

2. Description of the Related Art

Various methods and technologies exist for encoding documents digitally and transferring the digital representations to output devices. At the encoding stage, these range from hobbyist scanners and associated software to elaborate prepress systems. These systems have replaced traditional "cut and paste" approaches to layout, which required painstaking manual arrangement of the various document components—text, graphic patterns and photographic images—onto a white board for subsequent reproduction. Instead, designers can now manipulate all of these components at once using computers.

Output of the digitally encoded documents can take numerous forms, ranging from laser printing to digital exposure of photographic films to transfer of the image to lithographic plates for subsequent mass-quantity printing. In the latter case, the image to be printed is present on a plate or mat as a pattern of ink-accepting (oleophilic) and ink-repellent (oleophobic) surface areas. In a dry printing system, the plate is simply inked and the image transferred onto a recording material; the plate first makes contact with a compliant intermediate surface called a blanket cylinder which, in turn, applies the image to the paper or other recording medium. In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

Lithographic plates can be fabricated in various ways, ranging, once again, from traditional manual techniques involving photoexposure and chemical development to automated procedures involving computer control. Computer-to-plate systems can utilize pulses of electromagnetic radiation, produced by one or more laser or non-laser sources, to create physical or chemical changes at selected points of sensitized plate blanks (which, depending on the system, may be used immediately or following conventional photodevelopment); ink-jet equipment used to selectively deposit ink-repellent or ink-accepting spots on plate blanks; or spark-discharge equipment, in which an electrode in contact with or spaced close to a plate blank produces electrical sparks to alter the characteristics of certain areas on a printing surface, thereby creating "dots" which collectively form a desired image. As used herein, the term "imaging device" includes radiation sources (e.g., lasers), ink-jet sources, electrodes and other known means of producing image spots on blank printing plates, and the term "discharge" means the image-forming emissions produced by these devices. The term "image" refers to a lithographic representation of the final document to be reproduced. The term "plate" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement.

A second approach to laser imaging involves the use of transfer materials. See, e.g., U.S. Pat. Nos. 3,945,318; 3,962,513; 3,964,389; 4,245,003; 4,395,946; 4,588,674; and 4,711,834. With these systems, a polymer sheet transparent to the radiation emitted by the laser is coated with a transferable material. During operation the transfer side of this construction is brought into contact with an acceptor sheet, and the transfer material is selectively irradiated through the transparent layer. Typically, the transfer material exhibits a high degree of absorbence for imaging laser radiation, and ablates—that is, virtually explodes into a cloud of gas and charred debris—in response to a laser pulse. This action, which may be further enhanced by self-oxidation (as in the case, for example, of nitrocellulose materials), ensures complete removal of the transfer material from its carrier. Material that survives ablation adheres to the acceptor sheet.

Alternatively, instead of laser activation, transfer of the thermal material can be accomplished through direct contact. U.S. Pat. No. 4,846,065, for example, describes the use of a digitally controlled pressing head to transfer oleophilic material to an image carrier.

To create a printing plate, the transfer and acceptor materials are chosen to exhibit different affinities for fountain solution and/or ink, so that removal of the transparent layer together with unirradiated transfer material leaves a suitably imaged, finished plate.

Another important application of transfer materials is proofing. Graphic-arts practitioners use color proofing sheets (or simply "color proofs") to correct separation images prior to producing final separation plates, as well as to evaluate the color quality that will be obtained during the printing process. In typical printing processes, multicolor images cannot be printed directly using a single printing plate. Rather, composite color images are first decomposed into a set of constituent color components, or "separations", each of which serve as the basis for an individual plate. The colors into which the multicolor image is decomposed depends on the particular "color model" chosen by the practitioner. The most common color model is based on cyan, magenta, yellow and black constituents, and is referred to as the "CMYK" color model. If the separation is performed properly, subtractive combination of the individual separations produces the original composite image. A color proof represents, and permits the practitioner to view, the final image as it will appear when printed.

A color proof may be produced by irradiative transfer of a coloring agent, corresponding to one of the separation colors, onto a transparent acceptor sheet according to the distribution of that color in the final image. Transfer sheets corresponding to each color of the model can be applied to a single acceptor sheet and sequentially imaged, producing a single-sheet proof. Alternatively, a set of color proofs each corresponding to one of the colors may be superposed on each other in registration, thereby revealing the final image.

Mechanically, laser-based imaging systems can take a variety of forms. Laser output may be provided directly to the surface of a substrate via lenses or other beam-guiding components, or transmitted to the surface from a remotely sited laser using a fiber-optic cable. A controller and associated positioning hardware maintains the beam output at a precise orientation with respect to the substrate surface, scans the output over the surface, and activates the laser at positions adjacent selected points or areas of the substrate. The controller responds to incoming image signals corresponding to the original document or picture being copied onto the substrate to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the substrate, or as a combination of page-description language and one or more image data files. The bitmaps are constructed to define the hue of the color as well as screen frequencies and angles.

The imaging apparatus can be configured as a flatbed recorder or as a drum recorder, with the substrate mounted to the interior or exterior cylindrical surface of the drum. In the case of lithographic printing, the exterior drum design is more appropriate to use in situ, on a lithographic press, in which case the print cylinder itself constitutes the drum component of the recorder or plotter.

In the drum configuration, the requisite relative motion between the laser beam and the substrate is achieved by rotating the drum (and the substrate secured thereon) about its axis and moving the beam parallel to the rotation axis, thereby scanning the substrate circumferentially so the image "grows" in the axial direction. Alternatively, the beam can move parallel to the drum axis and, after each pass across the substrate, increment angularly so that the image on the substrate "grows" circumferentially. In both cases, after a complete scan by the beam, an image corresponding (positively or negatively) to the original document or picture will have been applied to the surface of the substrate.

Multiple imaging devices may be used to produce several lines of image spots simultaneously, with a corresponding increase in imaging speed. Regardless of the number of imaging devices used, their operation must be precisely controlled so that the discharges occur at the appropriate times to reach the intended dot locations on the printing surface. Each discharge source must be aligned with the substrate along longitudinal and lateral dimensions (corresponding to circumferential and axial directions in the case of drum imaging) at all points during a scan of the all candidate image points on the substrate, and, in the case of laser-based imaging, the beam must remain focused on the substrate for maximum energy-transfer efficiency.

Failure to maintain proper alignment along all relevant dimensions results in imaging inaccuracies and/or undesirable periodic artifacts that detract from the final image appearance. The consequences can be particularly acute in planographic printing contexts, since typical print jobs require sequential application of ink from several plates, each of which is vulnerable to image degradation if created digitally; the result is a cumulative aggregation of the imperfections associated with each plate. Laser imaging imposes perhaps the most demanding requirements, since adjustments along each of the three dimensions can result in introduction of distortions along the other dimensions.

The use of multiple imaging devices practically guarantees the occurrence of at least some printing artifacts at some resolutions. For example, even slight misalignment among imaging devices produces uneven "seams" between the regions or "zones" of the plate imaged by each device. These seams occur along the direction of imaging, and tend to be visible to the eye even when imaging takes place at high resolutions. Because the amount of misalignment that can produce visible artifacts is so slight, elimination of the problem through mechanical adjustment is unrealistic.

One electronic approach is disclosed in U.S. Pat. No. 5,453,777. In accordance with the teaching of that patent, compensation for imprecise device orientation (which may be exacerbated by focusing of the device) and "seam" artifacts is accomplished by, first, commencing imaging with the device having the greatest skew from proper orientation, and second, as a fine adjustment, repeating at least one column of image dots to produce intentional overlap between the imaging columns where a seam artifact would otherwise occur. Unfortunately, even this technique does not eliminate the artifacts in some circumstances.

Other approaches to avoiding seam artifacts have involved writing heads utilizing a series of discharge devices spaced closely together and along an axis perpendicular to the scanning axis. In these systems, the writing head makes successive passes across the recording medium, each pass applying a series of parallel rows of image spots. The problematic seams appear between successive passes of the writing head. Japanese Patent Application No. 60-107975, for example, discloses an ink-jet recording apparatus having a writing head comprising an array of 16 vertically aligned nozzles. A horizontal scan of the array, therefore, produces 16 parallel lines of image spots. To hide the seams between 16-line zones, the bottom eight nozzles of the array are selectively prevented from imaging during a scan; the array is then advanced vertically only halfway, so that the top eight nozzles overlie the eight lines just partially imaged by the bottom eight nozzles, and the top eight nozzles fill in the omitted image spots (as the bottom nozzles once again apply new image spots). It has been found, however, that the regular patterns of imaging locations reassigned from one nozzle set to the other can create their own visual artifacts.

Japanese Patent Application. No. 61-120578 illustrates a similar system that utilizes a less regular, apparently random blend pattern extending only marginally into adjacent imaging zones. This approach is likely to give unsatisfactory results in that a random pattern actually exacerbates the errors arising from device misalignment. These errors arise only at zone boundaries. Consequently, by perturbing the boundary only slightly, the errors will remain concentrated along a visible, vertically contiguous band. The effect, in other words, will not differ sufficiently from an unperturbed boundary. Moreover, the visual effect is worsened if the displacements occur at high frequency. In this case errors will be emphasized, since the rapid (and shallow) shifts in horizontal location only serves to make the errors more visible.

DESCRIPTION OF THE INVENTION

Brief Summary of the Invention

In accordance with the present invention, adjacent imaging devices are operated such that the zones they would ordinarily cover are blended. The invention improves upon prior-art approaches by ensuring sufficient visual disruption to eliminate seam artifacts, but without creating noticeable visual artifacts as a consequence of the disruption. The invention achieves these sometimes antithetical objectives through selection of parameters dictating the nature of the blend pattern and the dimensional extents of the elements of the pattern.

Generally, the operating environment of the invention is a digital imaging system including an array of imaging devices, which are used to apply an image to a recording medium such as a lithographic printing plate. Means are provided to cause relative movement between the imaging devices and the recording medium so as to effect a scan thereof, and the devices are operated to apply an imagewise pattern of dots to the recording medium. In one embodiment, each scan draws the imaging devices along the medium so that they traverse a series of longitudinal columns of dot locations, and the devices are fired only at appropriate dot locations as determined by the digital image data. Typically, the devices are not spaced closely together as in some prior-art systems, but are instead widely spaced. The imaging array is indexed after each column is applied, the sequence of columns for each imaging device defining the imaging zone for that device.

In accordance with the invention, imaging devices are assigned dot locations from an adjacent imaging zone. In other words, as a device traverses the sequence of columns representing its own imaging zone, it is rendered inactive over a pattern of locations. The system continues to advance the array even after all devices have scanned their own imaging zones so that each device continues to travel into the adjacent zone, applying image data to assigned dot locations in that zone; these are the same locations at which the adjacent device was held inactive. The pattern of assigned dot locations forms a blend pattern of extensions into the adjacent zone; importantly, the extensions create a non-repetitive pattern of longitudinally separated rows or "fingers" having varying (lateral) lengths. The non-repetitive pattern prevents the blend pattern from creating its own imaging artifacts. Generally, it is preferred for the rows to have lengths that do not vary substantially between adjacent rows, and which, on average, extend across a substantial part of the adjacent zone. The rows should also have sufficient thickness (i.e., longitudinal extent) to carry a visual impact.

It is further preferred to separate the extensions by intervening segments that may also extend into the adjacent imaging zone, but to a lesser extent. These intervening segments determine the frequency of the visual disruption.

In this way, troublesome artifacts are eliminated or substantially reduced while preserving full data integrity. That is, no image dots overlap one another; the final printed image corresponds exactly to the source image data. The operations of the invention merely alter, in a highly advantageous manner, the dot locations to which the imaging devices are assigned.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

To appreciate the operation and applicability of the present invention, it is necessary to place it in the context of a typical imaging environment. The following discussion assumes use of multiple laser-type imaging devices arranged linearly in a single writing head, as illustrated in FIG. 1, disposed on the cylinder-type imaging system shown in FIG. 2.

Figure 1:
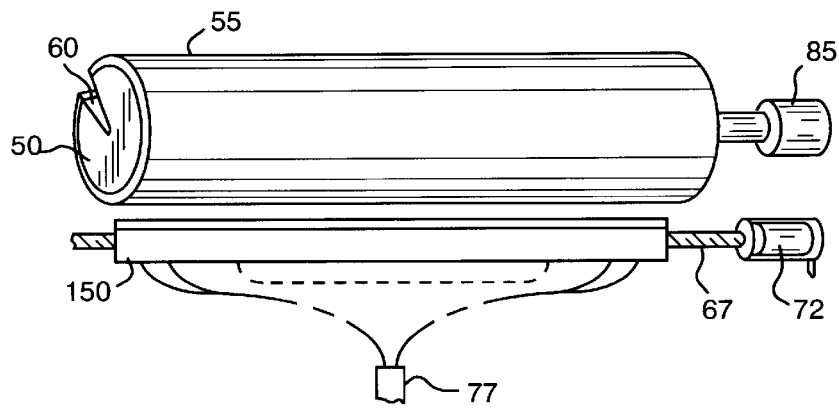
FIG. 1 is an isometric view of the cylindrical embodiment of an imaging apparatus to which the principles of the present invention may be applied, and which operates in conjunction with a linear-array writing array.
Figure 2:
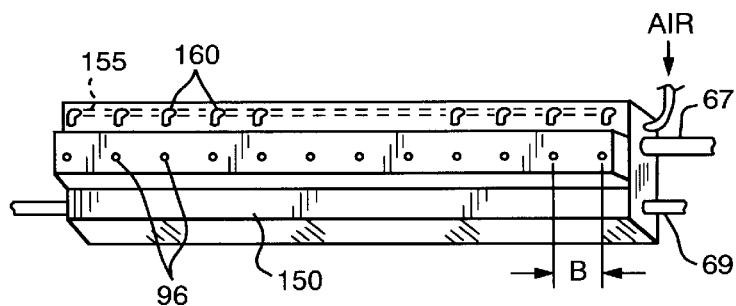
FIG. 2 is an isometric view of the front of a writing array as shown in FIG. 1.

The illustrative imaging environment of the present invention includes, as shown in FIG. 1, a cylinder 50 around which is wrapped a substrate (e.g., a lithographic plate blank or proofing sheet) 55. Cylinder 50 includes a void segment 60, within which the outside margins of substrate 55 are secured by conventional clamping means (not shown) or other suitable retention mechanism. We note that the size of the void segment can vary greatly depending on the environment in which cylinder 50 is employed.

If desired, cylinder 50 is straightforwardly incorporated into the design of a conventional lithographic press, and serves as the plate cylinder of the press. Alternatively, cylinder 50 may reside on a stand-alone platesetting or proofing apparatus. For exemplary purposes, the ensuing discussion assumes implementation on a lithographic printing press, it being understood that the invention is equally applicable to off-press and color-proofing applications, as well as alternative imaging configurations (flatbed, interior-arc, etc.) entirely.

In a typical press construction, where substrate 55 is a plate blank, the plate 55 receives ink from an ink train, whose terminal cylinder is in rolling engagement with cylinder 50. The latter cylinder also rotates in contact with a blanket cylinder, which transfers ink to the recording medium. The press may have more than one such printing assembly arranged in a linear array. Alternatively, a plurality of assemblies may be arranged about a large central impression cylinder in rolling engagement with all of the blanket cylinders.

The recording medium is mounted to the surface of the impression cylinder, and passes through the nip between that cylinder and each of the blanket cylinders. Suitable central-impression and in-line press configurations are described in U.S. Pat. Nos. 5,163,368, 4,936,211, and 4,911,075 (all commonly owned with the present application and hereby incorporated by reference).

Cylinder 50 is supported in a frame and rotated by a standard electric motor or other conventional means. The angular position of cylinder 50 is monitored by a position detector or shaft encoder 85, as described in further detail below. A writing array 150, mounted for movement on a lead screw 67 and a guide bar 69, traverses substrate 55 as it rotates. Axial movement of writing array 65 results from rotation of a stepper motor 72, which turns lead screw 67 and thereby shifts the axial position of writing array 65. Stepper motor 72 is activated during the time writing array 65 is positioned over void 60, after writing array 65 has passed over the entire surface of substrate 55. The rotation of stepper motor 72 shifts writing array 65 to the appropriate axial location to begin the next imaging pass.

Figure 3:
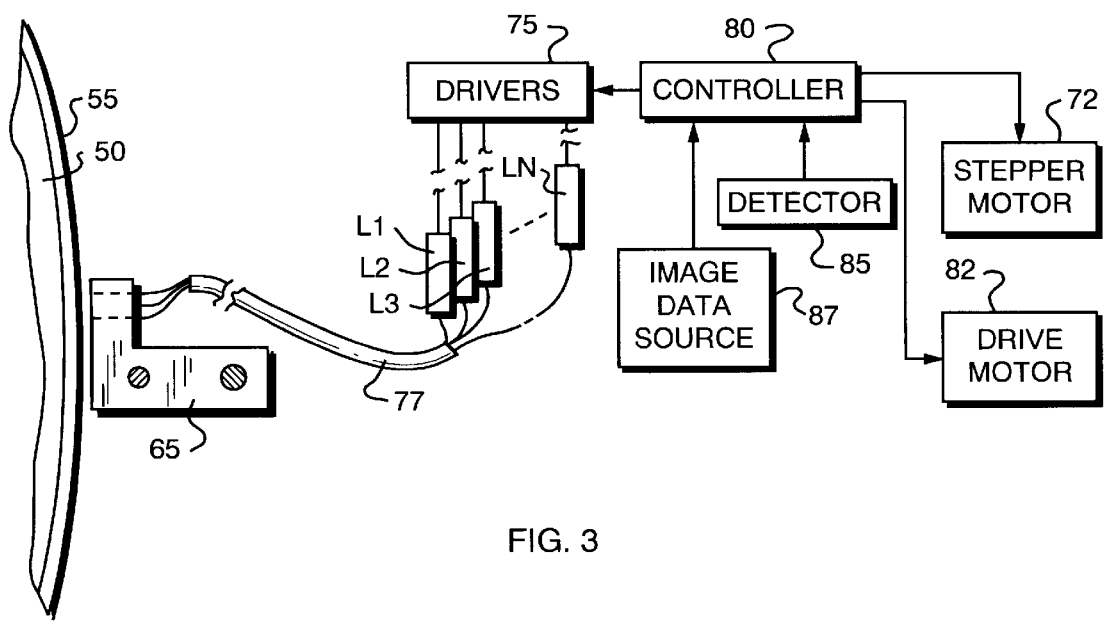
FIG. 3 is a schematic depiction of the imaging apparatus shown in FIG. 1, and which illustrates in greater detail its mechanism of operation.

As shown in FIG. 3, a series of laser sources $L_1, L_2, L_3 \ldots L_n$, driven by suitable laser drivers collectively designated by reference numeral 75, each provide output to a fiber-optic cable 77. The cable leads to a writing head 150, illustrated in detail in FIG. 2, which comprises a long linear body and a series of output assemblies 96 each fed by a fiber-optic cable drawn from bundle 77. The interior of writing array 150, or some portion thereof, contains threads that engage lead screw 67, rotation of which advances writing array 150 along substrate 55. Individual lens assemblies 96 are evenly spaced a distance B from one another. Distance B represents the width of an imaging zone, and corresponds to the difference between the axial length of substrate 55 and the distance between the first and last lens assembly; it also represents the total axial distance traversed by writing array 150 during the course of a complete scan, a distance increased in accordance with the present invention. Each time writing array 150 encounters void 60, stepper motor 72 rotates to advance writing array 150 an axial distance equal to the desired distance between imaging passes (i.e., the diameter of a print dot).

Return now to FIG. 3, which schematically depicts the organization or the control and drive apparatus. A controller 80 actuates laser drivers 75 when the associated lasers reach appropriate points opposite substrate 55, and in addition operates stepper motor 72 and the cylinder drive motor (not shown). Controller 80 receives data from two sources. The angular position of cylinder 50 with respect to writing array 65 is constantly monitored by detector 85, which provides signals indicative of that position to controller 80. The controller also contains a swath counter, which increments with each imaging pass, to provide an axial dimension to the angular position and thereby fully specify the position of each imaging element with respect to the surface of substrate 55. The second source of data, labeled IMAGE DATA SOURCE and indicated by reference numeral 87 in FIG. 3, is a computer on which is stored an image bitmap whose pixel density corresponds (or can be processed so as to correspond) to the substrate image density, and which also provides data signals to controller 80. The image data define points on substrate 55 where image spots are to be written. Controller 80, therefore, correlates the instantaneous relative positions of writing array 65 and substrate 55 (as reported by detector 85) with the image data to actuate the appropriate laser drivers at the proper times during scan of substrate 55. The control circuitry required to implement this scheme is well known in the scanner and plotter art; a suitable design is described in U.S. Pat. No. 5,182,990 (the entire disclosure of which is hereby incorporated by reference).

The laser output cables terminate in lens assemblies 96, mounted within writing array 65, that precisely focus the beams onto the surface of substrate 55. Suitable configurations are disclosed, for example, in U.S. Pat. No. 5,339,737, U.S. Ser. No. 08/676,470 (entitled DIODE-PUMPED LASER SYSTEM AND METHOD, filed Jul. 8, 1996), and U.S. Ser. No. 08/966,492 (entitled DIODE-PUMPED SYSTEM AND METHOD FOR PRODUCING IMAGE SPOTS OF CONSTANT SIZE, filed Nov. 7, 1997). An optional air manifold 155, connected to a source of pressurized air, contains a series of outlet ports 160 aligned with lens assemblies 96. Introduction of air into the manifold 155 and its discharge through the outlet ports 160 protects and cleans the lenses of airborne debris during operation, and also purges fine-particle aerosols and mists from the region between lens assemblies 96 and substrate surface 55.

Controller 80 either receives image data already arranged into longitudinal columns, each set of columns corresponding to a different imaging zone served by one of the lasers L, or can progressively sample, in columnar fashion, the contents of a database containing a complete bitmap representation of the image to be transferred. In either case, controller 80 recognizes the different relative positions of the lens assemblies with respect to substrate 55 and actuates the appropriate laser only when its associated lens assembly is positioned over a point to be imaged.

Figure 4:
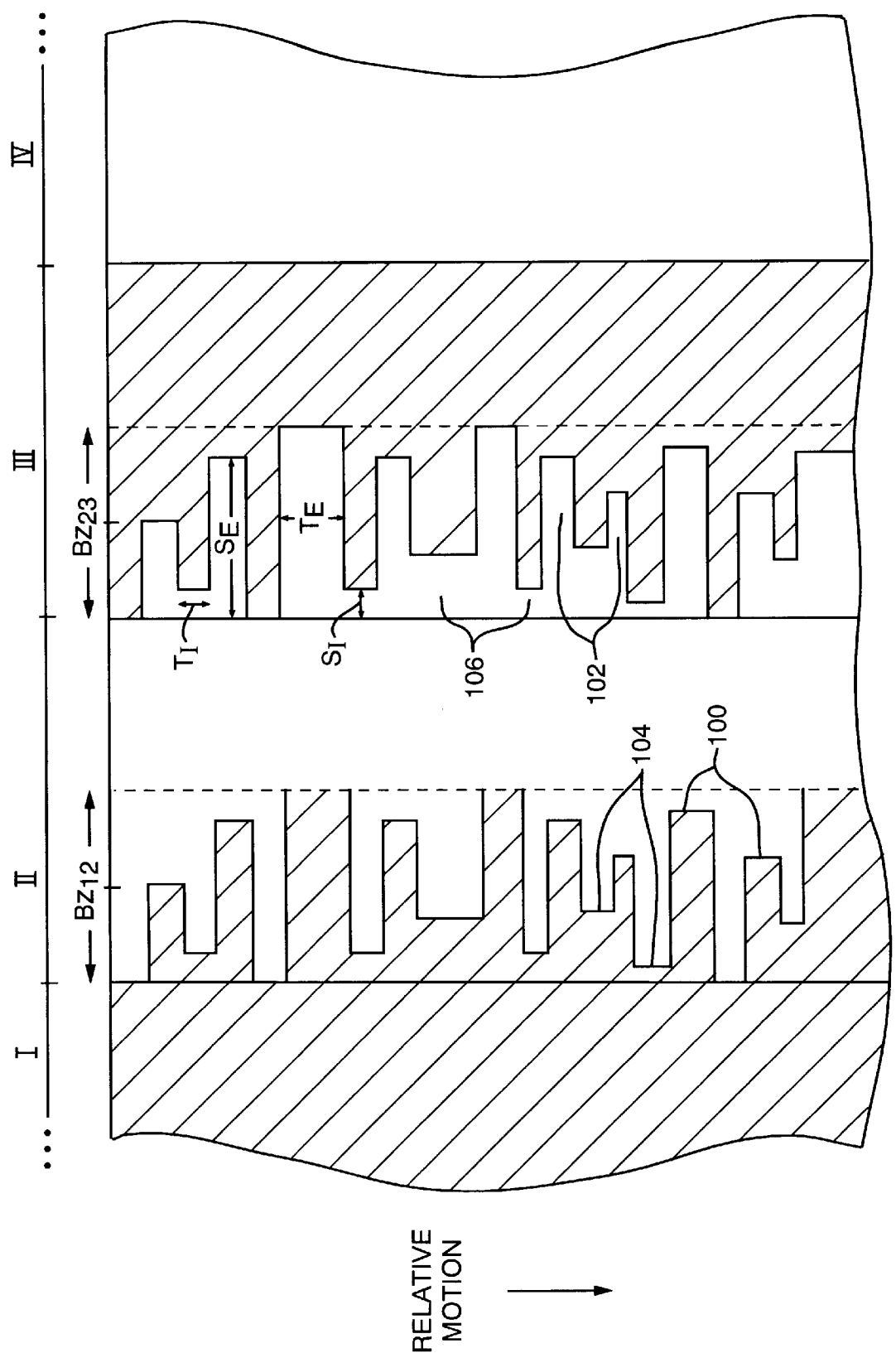
FIG. 4 illustrates operation of the present invention and the parameters affecting performance.

Refer to FIG. 4, which illustrates four imaging zones I–IV (zones I and IV being shown only partially), each of which represents the default area of operation of a particular laser $L_1$–$L_4$. In other words, absent application of the present invention, controller 80 sends each laser $L_1$–$L_4$ data corresponding to image-dot locations only within its respective imaging zone I–IV. The imaging regions of lasers $L_1$ and $L_3$ are shown shaded, while the imaging regions of lasers $L_2$ and $L_4$ are unshaded.

FIG. 4 shows the effect of applying the correction technique of the present invention to zones I and II. For purposes of explanation and comparison only, no correction is applied to zone III; as a result, zone IV remains unmodified. In accordance with the invention, controller 80 extends the imaging region for at least some of the lasers L (generally for all lasers other than the last laser $L_n$) into the adjacent zone in accordance with a non-repetitive pattern. The pattern comprises a series of extensions 100 from zone I into zone II, and a series of extensions 102 from zone II into zone III. Extensions 100 are separated by a series of shorter intervening segments 104, and extensions 102 are similarly separated by intervening segments 106.

Although for purposes of imaging the extensions represent incursions into an adjacent zone—that is, the extensions into zone II represent additional area imaged by $L_1$—the pattern formed by the extensions is designed so as not to appear weighted toward either zone; if, for example, if the pattern were merely a series of vertically adjacent extensions from the zone boundary into the adjacent zone, the result would appear "left-justified" at the boundary. Accordingly, for each imaging zone, a "blend zone" (representatively indicated at $BZ_{12}$ for zone II and $BZ_{23}$ for zone III) is defined. The width of the blend zone represents the maximum incursion (i.e., length) of an extension from the adjacent imaging zone. The pattern is generated such that the envelope of the extensions and intervening segments oscillates evenly across the centerline of each blend zone. In this way, the blend pattern is distributed consistently across zones, even though it is actually applied as a series of incursions.

It should be noted that while the pattern of extensions 100, 102 and intervening segments 104, 106 are depicted identically in FIG. 4, this need not be the case; instead, if desired, a plurality of patterns can be employed, or each imaging zone can be modified in accordance with a different pattern. It should also be emphasized that each of the depicted extensions and intervening segments represents a plurality of rows of image-dot locations, the number of rows depending on the resolution of the image—that is, the number of dot locations per unit distance.

The characteristics of the pattern are governed by several parameters, all of which may be routinely optimized for different resolutions or different imaging devices without undue experimentation. Each extension 100, 102 has a length $S_E$ defined as the incursion distance into the adjacent zone. The extensions 100, 102 also have a thickness (i.e., longitudinal extent) $T_E$. The intervening segments also have lengths $S_I$ and thicknesses $T_I$.

The lengths of the segments vary in order to create the non-repetitive effect. Preferably, the extensions intrude, on average or on an absolute basis, at least 10% into the width of the adjacent imaging zone; some of the extensions may occupy up to 100% of the adjacent zone, but preferably do not extend (on an average or absolute basis) more than 75% of the width of the adjacent zone, and even more preferably no more than 50% of the width of the adjacent zone. This provides disturbances running back and forth (relative to the direction of imaging) with sufficient magnitude—frequency is discussed below—to avoid visible boundaries between imaging zones. Given the constraint on length variation, this generally means that a majority of the extensions 100, 102 will pass at least this far into the adjacent zone. The lengths $S_I$ of the intervening segments are also relevant to the magnitude of the disturbances, since these determine the effective visual lengths of adjacent extensions: a shorter intervening segment means that the extensions above and below will appear longer. The combination of lengths $S_E$, $S_I$ determine the back-and-forth sweep of the pattern, and are chosen to create a ragged pattern that oscillates evenly across the centerline of the blend zone. These lengths may be generated by a randomizing or pseudorandomizing function.

The thickness $T_E$ of each extension should be sufficient to carry a visual impact. Naturally, the desired thickness in terms of dot locations depends on numerous factors, including the type of material being imaged, the resolution of the image, etc. In general, however, the rows have average thickness of least three dot locations, and this thickness varies throughout the pattern.

The thickness $T_I$ determines the frequency of the visual disruption created by extensions 100, 102. That frequency must be sufficiently high for the eye to integrate the extensions (so that each is not independently visible), but not so high that the overall blending effect is lost. Generally, the thicknesses $T_I$ of the intervening segments are on the same order as the thicknesses $T_E$ of the extensions.

Preferably, controller 80 is a programmable computer capable of generating random or pseudorandom numbers, and of performing the computations necessary to generate parameters for each extension and intervening segment in accordance with the foregoing parameter ranges. Of course, these ranges are not absolute, and can be straightforwardly modified to suit particular imaging applications, equipment, and resolutions.

In operation, controller 80, in concert with driver motor 82 and stepper motor 72, causes each laser L (via its associated output assembly 96) to pass over each dot location in its respective imaging zone. The image data used to control drivers 75, however, is modified so that the lasers are held inactive when passing over the pattern that will soon be applied by the previous imaging device. For example, with reference to FIG. 4, laser $L_2$ does not fire when passing over regions of zone II corresponding to extensions 100 and intervening segments 104. Controller 80 also assigns new bitmap image data to each laser (other than $L_n$) from the next imaging zone corresponding to the blend pattern extending into that zone. Driver motor 82 and stepper motor 72 are operated to draw the array 65 beyond the distance B (see FIG. 2) so that the lasers pass over regions in the next imaging zone. Scanning continues until the longest extensions have been fully imaged.

The necessary manipulations to mask and re-assign image data are readily performed on a bitmap using simple logic functions. For example, suppose the image data is ordinarily partitioned into separate blocks, each corresponding to an imaging zone. For each partition other than that assigned to $L_1$ (and representing zone I), a bitmap mask of the blend pattern corresponding to incursions from the previous zone is applied using logical AND operations on the inverse of the mask, so that all pixels within the blend pattern are set to zero. For each partition other than the last, the mask is applied using logical AND to the same data to define an extension block for the previous laser. The result of these operations is an irregular series of data zones that are utilized by controller 80 to govern the operation of each laser.

As described above, each blend pattern is confined to a single imaging zone. This need not be the case. The pattern can, instead, traverse the boundary between imaging zones. The technique described above is preferred, however, in that the parameters $S_E$, $S_I$ are measured from the location where the corrected artifacts would otherwise originate—i.e., from the boundary between zones. This facilitates simpler parameter optimization.

The foregoing technique corrects imaging artifacts that arise from lateral inconsistencies among lasers. It is desirably utilized in conjunction with timing-based corrections for longitudinal inconsistencies, as described, for example, in the '777 patent. As discussed therein, advantage is taken of the relative movement between substrate 55 and the output assemblies 96 to electronically delay or advance activation of various ones of the lasers by intervals corresponding to the degree of longitudinal error, thereby shifting the longitudinal substrate position at which these lasers apply image dots.

It will therefore be seen that the foregoing represents a robust and conveniently practiced approach to correcting artifacts produced by electronically actuated imaging devices. The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a digital imaging system including an array of imaging devices, means for bearing a substrate to be imaged by the imaging devices, and means for causing relative movement between the imaging devices and the substrate-bearing means to effect a scan of a substrate by the imaging devices in a series of longitudinal columns of dot locations, the dot locations corresponding to digital data representing an image, a method of correcting imaging errors comprising the steps of:

a. defining, for each imaging device including a terminal device, a corresponding imaging zone comprising a series of adjacent dot-location columns to be imaged sequentially by the imaging device;

b. for at least some of the devices, assigning dot locations from an adjacent imaging zone, the assigned dot locations forming a non-repetitive blend pattern of extensions into the adjacent imaging zone, each extension comprising at least one row of dot locations having a longitudinal thickness of at least three dot locations; and c. causing each of the imaging devices to image, in accordance with the digital data, (i) the dot locations in the corresponding imaging zone other than dot locations assigned to another imaging device, and (ii) any assigned dot locations in the adjacent imaging zone.

2. The method of claim 1 wherein each imaging zone has a width and each extension comprises a row of dot locations, the rows having an average extent of at least 10% of the width of the adjacent zone.

3. The method of claim 2 wherein the average extent is no greater than 75% of the width of the adjacent zone.

4. The method of claim 2 wherein the average extent is no greater than 50% of the width of the adjacent zone.

5. The method of claim 1 wherein, for each pair of adjacent imaging zones, the blend pattern extends into both zones.

6. The method of claim 1 wherein each blend pattern is confined to a single imaging zone.

7. The method of claim 6 wherein each blend pattern is confined within a blend zone having a centerline, the blend pattern oscillating evenly across the centerline.

8. The method of claim 1 wherein the blend pattern defines a nonlinear contour.

9. The method of claim 1 wherein the imaging devices are lasers.

10. A digital imaging system comprising:
  a. an array of imaging devices;
  b. means for bearing a substrate to be imaged by the imaging devices;
  c. means for causing relative movement between the imaging devices and the substrate-bearing means to effect a scan of a substrate by the imaging devices in a series of longitudinal columns of dot locations, the dot locations corresponding to digital data representing an image and defining, for each imaging device including a terminal device, a corresponding imaging zone comprising a series of adjacent dot-location columns to be imaged sequentially by the imaging device; and
  d. a controller for (i) assigning, for at least some of the devices, dot locations from an adjacent imaging zone, the assigned dot locations forming a non-repetitive blend pattern, and (ii) causing each imaging device to image, in accordance with the digital data,
    A. the dot locations in the corresponding imaging zone other than dot locations assigned to another imaging device, and
    B. the assigned dot locations in the adjacent imaging zone.

11. The apparatus of claim 10 wherein each imaging zone has a width and each extension comprises at least one row of dot locations, the rows having an average extent of at least 10% of the width of the adjacent zone.

12. The apparatus of claim 11 wherein the average extent is no greater than 75% of the width of the adjacent zone.

13. The apparatus of claim 11 wherein the average extent is no greater than 50% of the width of the adjacent zone.

14. The apparatus of claim 10 wherein, for each pair of adjacent imaging zones, the blend pattern extends into both zones.

15. The apparatus of claim 10 wherein each blend pattern is confined to a single imaging zone.

16. The method of claim 15 wherein each blend pattern is confined within a blend zone having a centerline, the blend pattern oscillating evenly across the centerline.

17. The apparatus of claim 10 wherein the blend pattern defines a nonlinear contour.

18. The apparatus of claim 10 wherein the imaging devices are lasers.

* * * * *